(12) United States Patent
Matsumura et al.

(10) Patent No.: US 10,182,175 B2
(45) Date of Patent: Jan. 15, 2019

(54) INFORMATION PROCESSING APPARATUS

(71) Applicants: Yutaka Matsumura, Kanagawa (JP); Hidenori Shindoh, Tokyo (JP)

(72) Inventors: Yutaka Matsumura, Kanagawa (JP); Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/467,063

(22) Filed: Mar. 23, 2017

(65) Prior Publication Data
US 2017/0289396 A1 Oct. 5, 2017

(30) Foreign Application Priority Data

Mar. 29, 2016 (JP) ................................. 2016-066734

(51) Int. Cl.
H04N 1/387 (2006.01)
H04N 1/32 (2006.01)

(52) U.S. Cl.
CPC ....... *H04N 1/3878* (2013.01); *H04N 1/32149* (2013.01); *H04N 2201/0081* (2013.01); *H04N 2201/0434* (2013.01)

(58) Field of Classification Search
CPC ............. H04N 1/3878; H04N 1/32149; H04N 2201/0081; H04N 2201/0434

USPC ............................... 358/3.28, 3.06, 534, 539
See application file for complete search history.

(56) References Cited

U.S. PATENT DOCUMENTS

| 8,014,559 | B2 | 9/2011 | Ishii | |
| 2006/0109515 | A1* | 5/2006 | Zhao | G07D 7/20 |
| | | | | 358/3.28 |
| 2006/0285168 | A1* | 12/2006 | Horino | H04N 1/387 |
| | | | | 358/3.28 |
| 2009/0174912 | A1* | 7/2009 | Asano | H04N 1/32149 |
| | | | | 358/474 |

FOREIGN PATENT DOCUMENTS

| JP | 2006-279640 | 10/2006 |
| JP | 2007-282200 | 10/2007 |

* cited by examiner

*Primary Examiner* — Quang N Vo
(74) *Attorney, Agent, or Firm* — Oblon, McClelland, Maier & Neustadt, L.L.P.

(57) ABSTRACT

An information processing apparatus includes a manuscript reader configured to read a manuscript, an embedment processing unit configured to perform a process of embedding additional information into data of the manuscript that has been read by the manuscript reader. The embedment processing unit embeds, as the additional information, a pattern including a plurality of dots arranged in such a shape that an inclination of the manuscript is detectable.

8 Claims, 14 Drawing Sheets

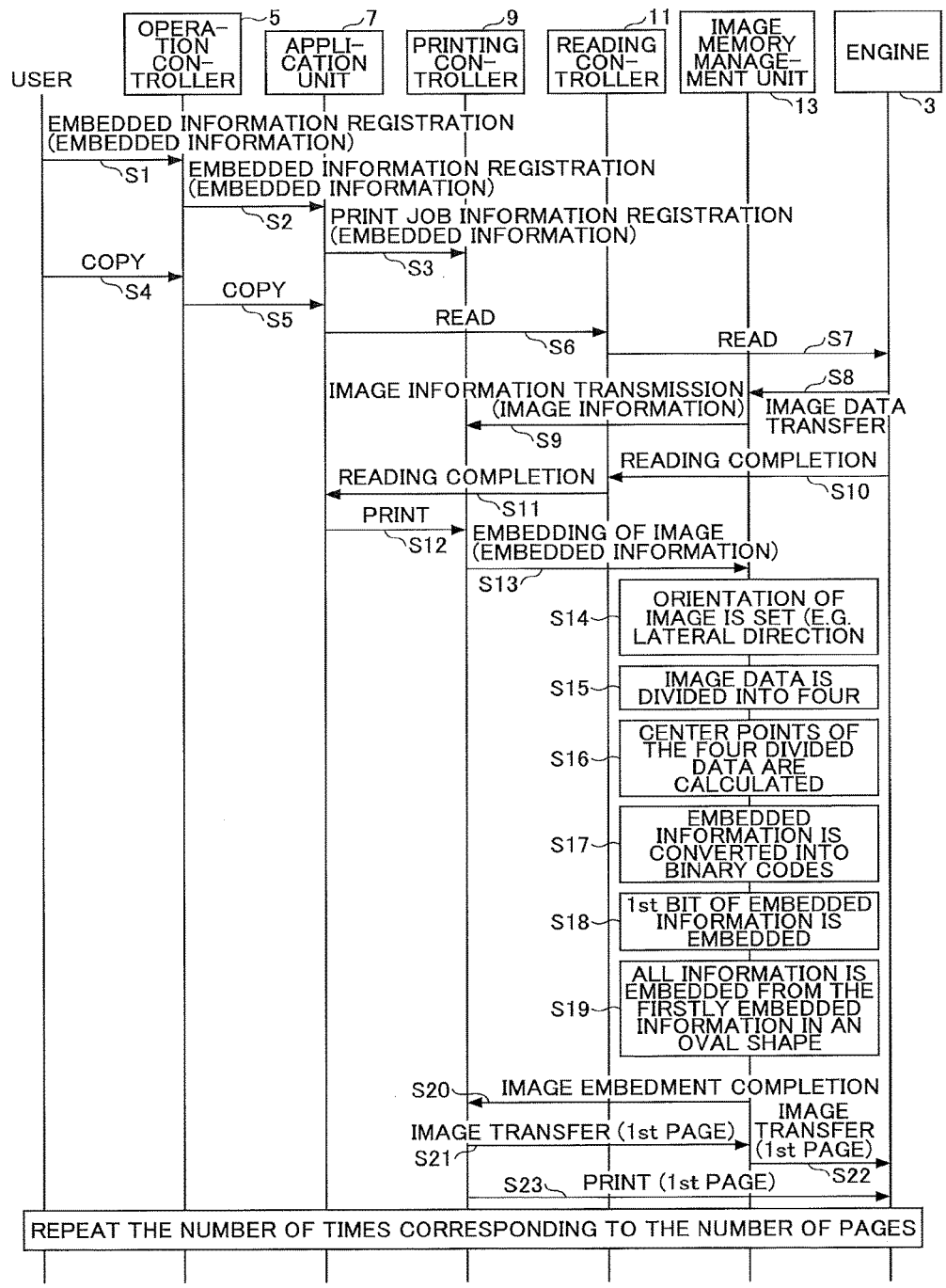

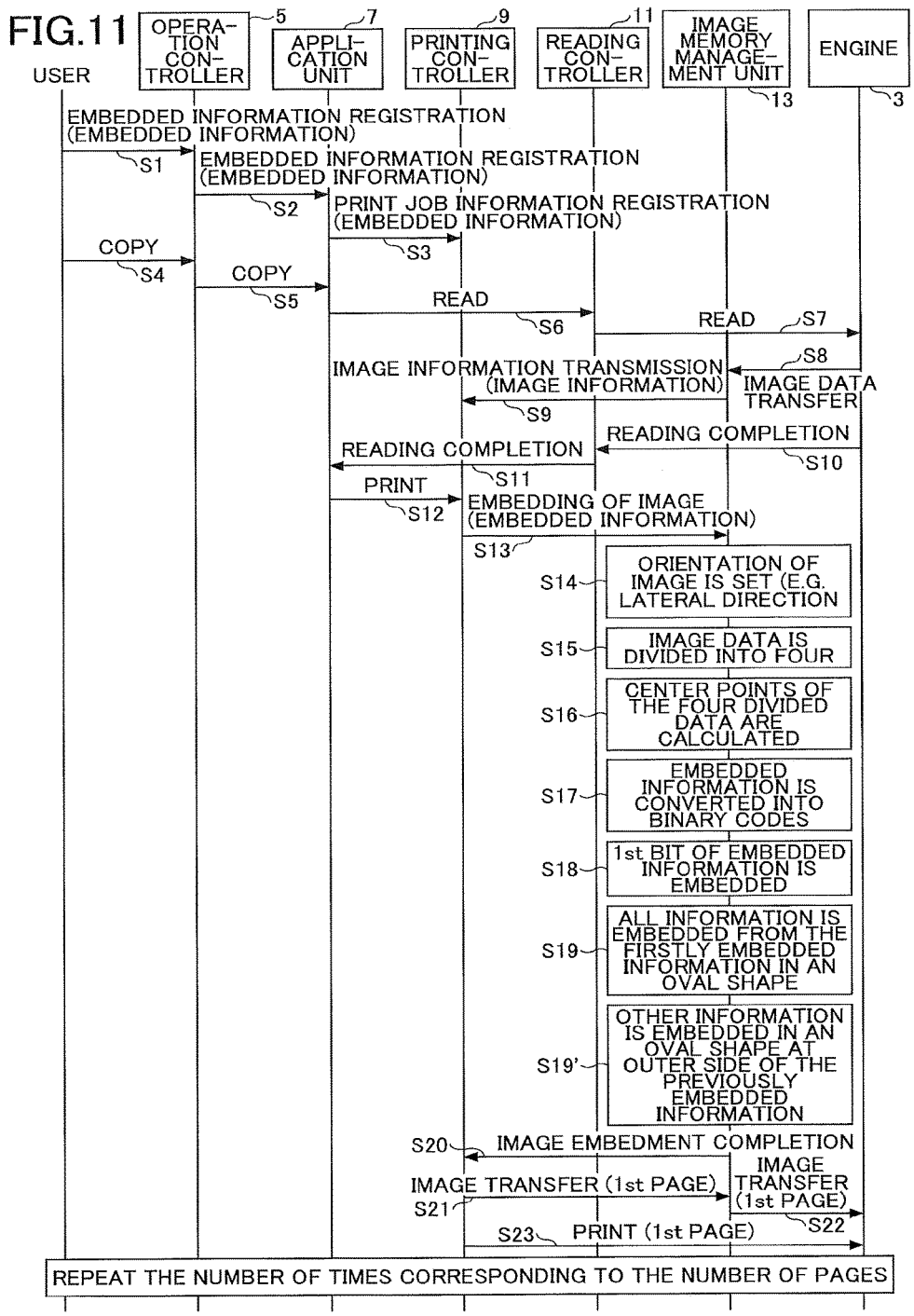

INFORMATION PROCESSING APPARATUS

CROSS-REFERENCE TO RELATED APPLICATIONS

The present application claims priority under 35 U.S.C. § 119 to Japanese Patent Application No. 2016-066734 filed on Mar. 29, 2016, the entire contents of which are incorporated herein by reference.

BACKGROUND OF THE INVENTION

1. Field of the Invention

The disclosures herein generally relate to information processing apparatuses that embed additional information in manuscripts.

2. Description of the Related Art

In industrial fields of multifunction peripherals, information leakage risks are of increasing concern. Japan Network Security Association (JNSA) "2013 Information Security Incidents Survey Report" shows survey results of leakage routes. According to the survey results, the leakage routes include 67.7% for paper media and 16.4% for portable media (such as e-mail and USB). These media are used with multifunction peripherals, and occupy a very high percentage that is 84.1% in total.

In the technical fields of multifunction peripherals, visible image embedding technologies as represented by ground tint printing have recently brought about deterrent effects on the information leakage. However, information that has been embedded is visible, and thus layouts might be affected and tampering of such information that has been embedded could be easy. Additionally, invisible image embedding technologies such as digital watermark have been already known.

Regarding the invisible image embedding technologies, a user sets a manuscript on a multifunction peripheral, designates information to be embedded, and prints the manuscript with a digital watermark. The multifunction peripheral converts the information designated by the user into minute points having a pattern, and embeds the patterned points in a printed medium. The information that has been embedded is detected by, for example, Auto Document Feeder (ADF) scanning the printed manuscript.

For example, Japanese Unexamined Patent Application Publication No. 2006-279640 discloses a method for embedding minute points in an original image to embed a large amount of information in a printed medium without disturbing human vision.

SUMMARY OF THE INVENTION

In one embodiment, an information processing apparatus includes a manuscript reader configured to read a manuscript, an embedment processing unit configured to perform a process of embedding additional information into data of the manuscript that has been read by the manuscript reader. The embedment processing unit embeds, as the additional information, a pattern including a plurality of dots arranged in such a shape that an inclination of the manuscript is detectable.

BRIEF DESCRIPTION OF THE DRAWINGS

FIG. 3 is a sequence chart illustrating an operation of the information processing apparatus, as one example in the first embodiment;

FIG. 11 is a sequence chart illustrating an operation of the information processing apparatus, as one example in the fourth embodiment;

DESCRIPTION OF THE PREFERRED EMBODIMENTS

It is a general object of at least one embodiment of the present invention to provide an information processing apparatus that substantially obviates one or more problems caused by the limitations and disadvantages of the related art.

Figure 1:
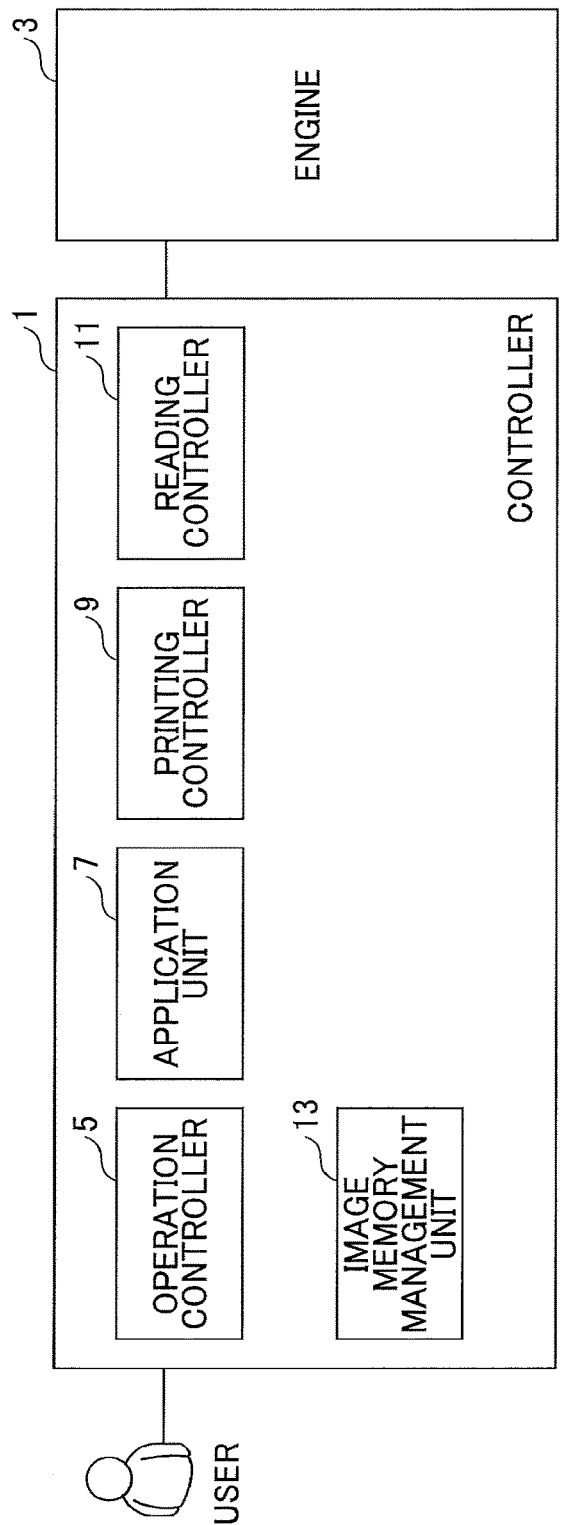
FIG. 1 is a functional block diagram of one example of an information processing apparatus.

In the following, embodiments of the present invention will be described with reference to the accompanying drawings. It should be noted that for each of the drawings, identical or corresponding components to those previously defined are referred to by the same numerals. Hence, their descriptions are omitted. FIG. 1 is a functional block view of one example of an information processing apparatus.

The information processing apparatus illustrated in FIG. 1 includes a controller 1 and an engine 3. The controller 1 includes an operation controller 5, an application unit 7, a printing controller 9, a reading controller 11, and an image memory management unit 13.

The engine 3 reads a manuscript into which information is to be embedded. The engine 3 transfers image data of the manuscript that has been read to the image memory management unit 13 in the controller 1. The engine 3 transmits a reading completion report for reporting that the manuscript has been read to the reading controller 11 in the controller 1.

The engine 3 is one example of a manuscript reader. The manuscript is to be read by the manuscript reader, as one example. The image data of the manuscript that has been read is one example of data of the manuscript that has been read by the manuscript reader, in one or more embodiments.

The information that is to be embedded and that has been designated by a user is registered in the operation controller 5. The operation controller 5 instructs the application unit 7 to register the information that is to be embedded and that has been registered. The operation controller 5 instructs the application unit 7 to copy the manuscript (such as a paper medium) that has been set by the user. As one example, the information that has been embedded may function as an invisible digital watermark. However, the information that has been embedded may function as a visible digital watermark, as appropriate.

The information that is to be embedded and that has been registered in the operation controller 5 is registered in the application unit 7. The application unit 7 instructs the printing controller 9 to register the information that is to be embedded and that has been registered. The application unit 7 instructs the reading controller 11 to read the manuscript, and also instructs the printing controller 9 to print the manuscript.

The information that is to be embedded and that has been registered in the application unit 7 is registered in the printing controller 9. The printing controller 9 instructs the image memory management unit 13 to perform a process of embedding (i.e., embedding process) the information into image information of the image data that has been read by the engine 3. The printing controller 9 instructs the image memory management unit 13 to transfer the image data in which the information has been embedded. The printing controller 9 instructs the engine 3 to print the manuscript. The printing controller 9 is one example of an embedment controller, in one or more embodiments.

The reading controller 11 instructs the engine 3 to read the manuscript. The reading controller 11 transmits the reading completion report to the application unit 7.

The image memory management unit 13 transmits to the printing controller 9 the image information of the image data that has been read. In response to the instruction from the printing controller 9, the image memory management unit 13 performs the embedding process. The image memory management unit 13 makes an embedment completion report to the printing controller 9. In response to a transfer instruction for transferring the image data, the image memory management unit 13 transfers to the engine 3 the image data in which the information has been embedded (i.e., embedded image). The image memory management unit 13 is one example of an embedment processing unit, in one or more embodiments.

The steps in the embedding process performed by the image memory management unit 13 will be described specifically. First, the orientation of the image that has been read as the image data can be set to a predetermined direction.

The image that has been read is divided into a plurality of areas (e.g., four areas). Center points of the divided areas are calculated. Next, the information to be embedded is converted into binary codes. The first bit in the binary codes of the information is embedded. Starting from the firstly embedded information, all information is embedded in an oval shape. Any of these steps in the embedding process can be arranged optionally.

Figure 2:
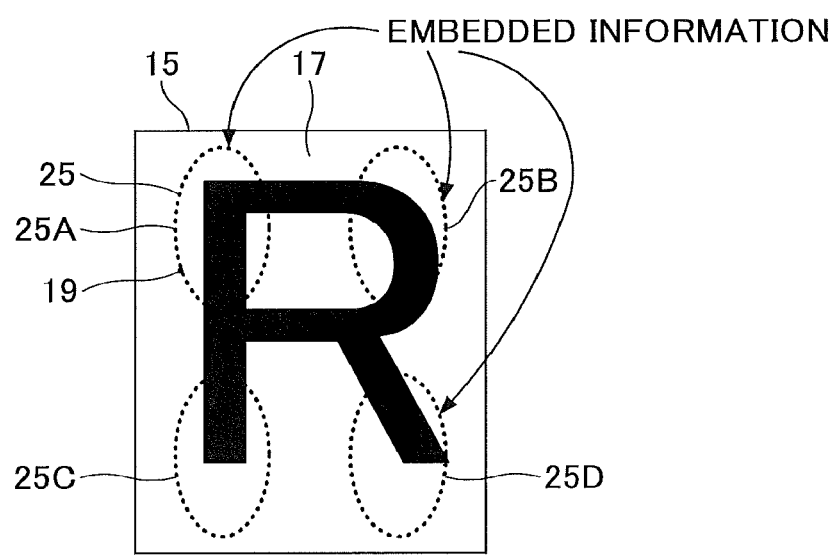
FIG. 2 is a view of a manuscript in which additional information is embedded by the information processing apparatus, as one example in a first embodiment.

FIG. 2 is a view of the image data (i.e., image 15) of the manuscript in which the information has been embedded, in a first embodiment of FIG. 1. The image 15 displays an object 17. The image 15 is one example of the manuscript that has been read by the manuscript reader, and represents the image data of the manuscript, in one or more embodiments.

The image 15 of FIG. 2 includes four patterns 25 (i.e., patterns 25A to 25D). Each of the four patterns 25 is embedded such that a plurality of dots 19 are arranged to have a given shape (e.g., an oval shape in the first embodiment). In the first embodiment, the four patterns 25 correspond to the embedded information (i.e., one example of additional information in one or more embodiments). The plurality of dots 19 are, for example, included in a plurality of dot patterns corresponding to the embedded information, in one or more embodiments.

Each of the patterns 25A to 25D includes the plurality of dots 19 arranged in such a shape (e.g., an oval shape in the first embodiment) that an inclination of the manuscript that has been read is recognizable and detectable. Since each of the four patterns 25A to 25D includes the plurality of dots 19 as described above, the inclination of each pattern is recognizable and detectable from such a shape (e.g., an oval shape in the first embodiment).

In the first embodiment, the additional information has been embedded in the image data of the manuscript, as a pattern including a plurality of dots arranged in such a shape that an inclination of the manuscript that has been read is recognizable. Therefore, in detecting the additional information that has been embedded in the manuscript, the location or range of the additional information that has been embedded in the manuscript is easily identifiable. Accordingly, the additional information that has been embedded in the image data of the manuscript is determined easily.

By embedding the additional information as a pattern having such a shape that an inclination is recognizable in the image of the manuscript, an inclination angle of the image displayed on the manuscript (hereinafter, referred to as manuscript image) can be determined in extracting the additional information that has been embedded. Accordingly, the determined inclination angle of the manuscript image is corrected so that the additional information that has been embedded in the image data of the manuscript can be extracted with high accuracy.

As in the first embodiment, by embedding the additional information in an oval-shaped pattern, the additional information that has been embedded is easily extracted, because an inclination of the oval pattern is easily recognizable. Since the oval pattern has an easily identifiable shape, an operation of embedding the additional information is facilitated.

In some cases, when the engine 3 reads the manuscript, the orientation of the manuscript might be misaligned. In such cases, the orientation of the manuscript that has been read is misaligned with the orientation of the pattern in which the additional information has been embedded. The additional information that has been embedded might not be detected accurately. For this reason, in the first embodiment, the orientation of the manuscript can be changed to a predetermined direction.

By changing the orientation of the manuscript to such a predetermined direction, the orientation of the pattern in which the additional information has been embedded can be aligned with the orientation of the manuscript that has been read. The accuracy in detecting the embedded information is therefore improved.

FIG. 3 is a sequence chart illustrating one example of an operation of the information processing apparatus, as one example in the first embodiment. The functions of the units illustrated in FIG. 1 are described with reference to FIG. 3. First, a user registers additional information to be embedded in the operation controller 5 (step S1). The additional information that is to be embedded and that has been registered in the operation controller 5 is also registered in the application unit 7 (step S2). The additional information that is to be embedded and that has been registered in the application unit 7 is further registered in the printing controller 9 (step S3).

The operation controller 5 instructs the application unit 7 to copy the manuscript such as a paper medium that has been set by the user (step S4, step S5). On receiving such an instruction, the application unit 7 instructs the reading controller 11 to read the manuscript (step S6). The reading controller 11 instructs the engine 3 to read the manuscript (step S7). On receiving such an instruction, the engine 3 reads the manuscript, and transfers the image data that has been read to the image memory management unit 13 (step S8). In the process from step S1 to step S8, the manuscript is read.

The image memory management unit 13 transmits to the printing controller 9 the image information of the image data that has been read (step S9). After reading the image data, the engine 3 transmits the reading completion report to the reading controller 11 (step S10). The reading controller 11 transmits the reading completion report to the application unit 7 (step S11). On receiving the reading completion report, the application unit 7 instructs the printing controller 9 to print the manuscript (step S12).

On receiving a printing instruction for printing the manuscript, the printing controller 9 instructs the image memory management unit 13 to perform the process of embedding (i.e., embedding process) the additional information in the image information of the image data that has been read (step S13). On receiving the instruction from the printing controller 9, the image memory management unit 13 performs the embedding process.

Specifically, the image memory management unit 13 sets the orientation of the image that has been read as the image data to a predetermined direction (step S14). Then, the image that has been read is divided into four areas (step S15). The center points in the divided areas are calculated (step S16). Next, the additional information to be embedded is converted into binary codes (step S17). The first bit in the binary codes of the additional information is embedded (step S18). Subsequently, starting from the firstly embedded information, all the information is embedded in an oval shape (step S19). It should be noted that the above-described embedding process can be performed optionally, and the order of performing the above-described embedding process can be set optionally.

When the embedding process of embedding the additional information is completed, the image memory management unit 13 makes an embedment completion report to the printing controller 9 (step S20). On receiving the embedment completion report of reporting that the embedding process has been completed, the printing controller 9 instructs the image memory management unit 13 to transfer the image data in which the additional information has been embedded (step S21). On receiving the instruction for transferring the image data, the image memory management unit 13 transfers to the engine 3 the image data in which the additional information has been embedded (i.e., embedded image) (step S22).

The printing controller 9 instructs the engine 3 to print the manuscript (step S23). By step S23, the embedding process of embedding the additional image in one page of the manuscript is completed. For a plurality of pages of the manuscript, the embedding process from step S1 to step S23 is repeated a plurality of times corresponding to the number of pages in the manuscript.

Figure 4A:
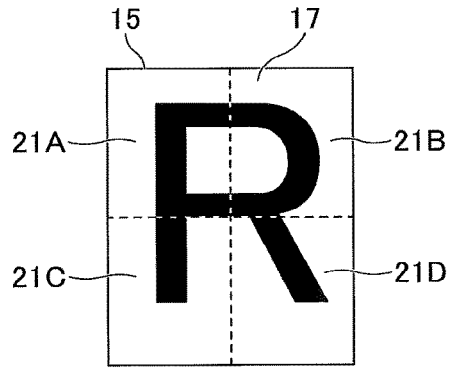
FIG. 4A to FIG. 4D illustrate a procedure of embedding the additional information by the information processing apparatus, as one example in the first embodiment.

FIG. 4A to FIG. 4D illustrate a procedure of embedding the additional information in the manuscript. The procedure illustrated in FIG. 4A to FIG. 4D corresponds to step S15 to step S19 of FIG. 3. In FIG. 4A, the image 15 displaying the object 17 is divided into four areas (i.e., areas 21A to 21D).

Figure 4B:
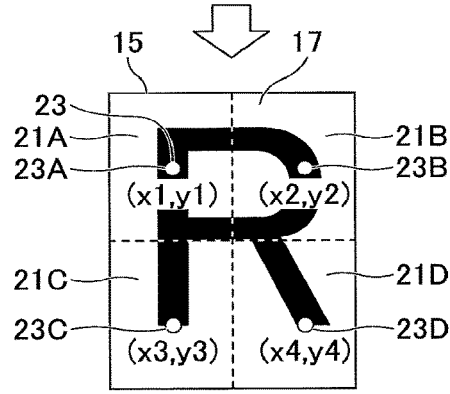

In FIG. 4B, respective center points 23A to 23D of the areas 21A to 21D are calculated. The center points 23A to 23D respectively have coordinates (x1, y1), (x2, y2), (x3, y3), and (x4, y4) in the image 15.

Figure 4C:
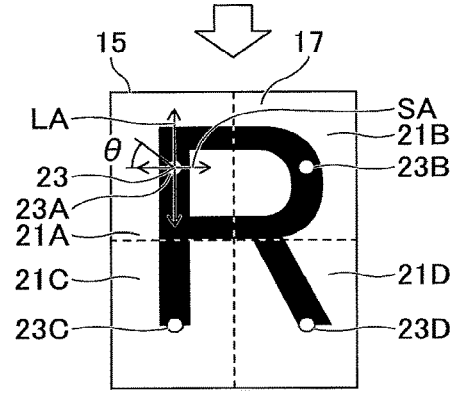

In FIG. 4C, long axes LA and short axes SA that intersect with each other at right angles at the center points 23A to 23D are determined using the respective coordinates (x1, y1), (x2, y2), (x3, y3), and (x4, y4) of the center points 23A to 23D in the areas 21A to 21D. In the areas 21A to 21D, angles of a plurality of dots to be arranged are determined using the center points 23A to 23D, the long axes LA, and the short axes SA. Then, coordinates at which the plurality of dots are to be arranged are determined using the center points 23A to 23D, the long axes LA, the short axes SA, and the angles that have been determined.

Figure 4D:
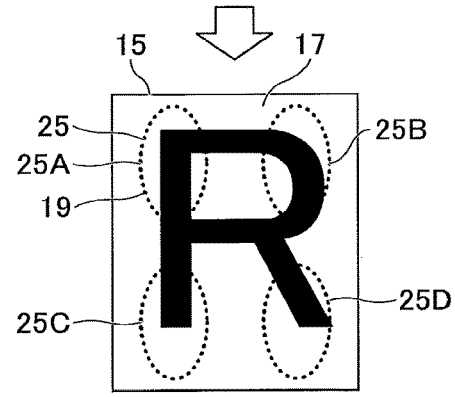

In FIG. 4D, the additional information to be embedded is converted into binary codes, and in FIG. 4C, the plurality of dots are allocated at the coordinates that have been determined. This process enables embedment of the additional information as patterns 25A to 25D, in each of which the plurality of dots 19 are arranged in an oval shape, respectively in the areas 21A to 21D of the image 15.

Figure 5:
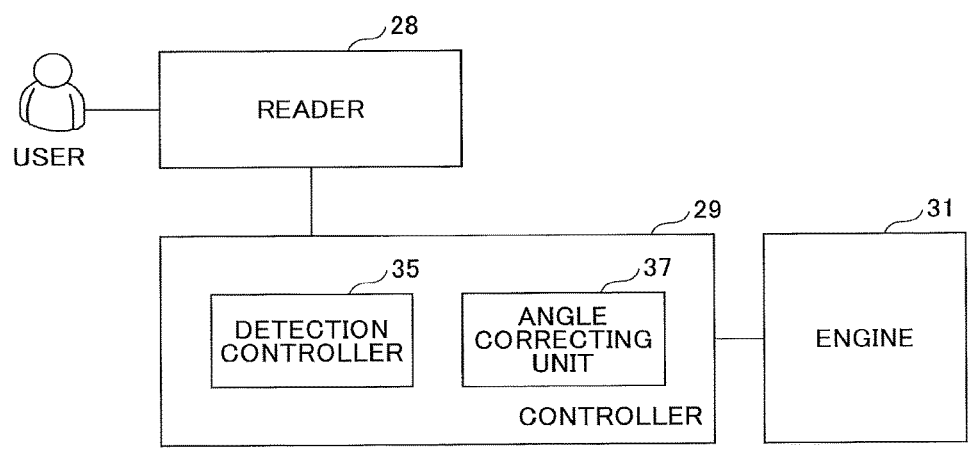
FIG. 5 is a functional block diagram of one example of an information processing apparatus.

FIG. 5 is a functional block diagram of an information processing apparatus that detects the additional information that has been embedded in the image data of the manuscript, as one example of the information processing apparatus, in one or more embodiments. The information processing apparatus illustrated in FIG. 5 includes a reader 28, a controller 29, and an engine 31. The controller 29 includes a detection controller 35 and an angle correcting unit 37. It should be noted that the reader 28, the detection controller 35, the engine 31, and the angle correcting unit 37 are respective examples of a manuscript reader, a detection controller, a detection processing unit, and an angle correcting unit.

In accordance with an instruction from a user, the reader 28 reads the image data (i.e., image 15) in which the additional information is embedded (see FIG. 4D). The additional information is embedded in the image 15 as a pattern including the plurality of dots 19 arranged in such a shape (i.e., an oval shape in the first embodiment) that an inclination of the manuscript that has been read is recognizable. That is to say, the pattern has such a shape that the inclination of the pattern is recognizable as described above (i.e., an oval shape in the first embodiment). In the first embodiment, the additional information has been embedded as four oval-shaped patterns (i.e., patterns 25A to 25D illustrated in FIG. 2 and FIG. 4D) in the image 15.

The detection controller 35 instructs the engine 31 to perform a process of detecting the additional information that has been embedded in the image data (i.e., image 15) of the manuscript that has been read by the reader 28. In response to the instruction, the engine 31 performs the process of detecting the additional information that has been embedded.

In accordance with an inclination angle between the inclination of the pattern in which the additional information that has been embedded in the image data (i.e., image 15) of the manuscript that has been read by the reader 28 and the inclination of the pattern of a manuscript for reference (i.e., reference manuscript) that is prepared beforehand, the angle correcting unit 37 corrects the inclination of the reference manuscript. It should be noted that the manuscript for reference (i.e., reference manuscript) is one example of the reference manuscript, in one or more embodiments.

The reference manuscript means the manuscript obtained when the reader 28 reads the manuscript in a proper direction (in other words, when the reader 28 reads the manuscript with the orientation of the manuscript being aligned), as the image data of the manuscript in which the additional information has been embedded before the reader 28 reads the manuscript. The inclination angle may be a relative angle.

Specifically, it may be assumed that the inclination angle of the pattern in the reference manuscript is set at 0 degrees. In a case where the pattern of the image data (i.e., image 15) in the manuscript that has been read by the reader 28 inclines by 10 degrees with respect to the inclination of the pattern in the reference manuscript, the inclination angle is determined to be 10 degrees. Alternatively, it may be assumed that an inclination angle of the pattern in the image data of the manuscript that has been read is set at 0 degrees. In such a case, the inclination angle may be determined to be 10 degrees.

The angle correcting unit 37 corrects the inclination angle of the reference manuscript in accordance with the inclination angle that has been determined. To be specific, when the inclination angle is determined to be 10 degrees as described above, the angle correcting unit 37 corrects the inclination angle of the reference manuscript by 10 degrees. The angle correcting unit 37 may correct the inclination angle of the pattern embedded in the image data of the reference manuscript to match the inclination angle of the pattern embedded in the image 15. Alternatively, the inclination angle of the image data (i.e., image 15) that has been read by the reader 28 may be corrected.

The engine 31 detects the pattern, in which the inclination angle of the reference manuscript has been corrected by the angle correcting unit 37, as the pattern that has been embedded as the embedded information in the image 15. This configuration enables the extraction of the additional information that has been embedded with high accuracy, even in the case where the manuscript in which the additional information has been embedded is read with the orientation of the manuscript being inclined.

The additional information is embedded in such a shape that an inclination of, for example, an oval is recognizable. This configuration makes easily identifiable the location or range of the additional information that has been embedded in the image data of the manuscript, when the additional information that has been embedded in the image data of the manuscript is detected.

In particular, when the angle correcting unit 37 corrects the inclination angle of the pattern, it is easy to identify the positional relationship between the pattern of the reference manuscript and the pattern of the image data (i.e., image 15) of the manuscript that has been read by the reader 28. Thus, the inclination angle of the pattern is easily corrected. The additional information that has been embedded in the image data of the manuscript is extracted with high accuracy.

The additional information is embedded as an oval-shaped pattern in the first embodiment. Such an oval shape is easily recognizable, and hence the additional information that has been embedded is easily extracted. By detecting such an oval-shaped pattern, it is easy to determine the positional relationship between the pattern in the reference manuscript and the pattern in the image data (i.e., image 15) of the manuscript that has been read by the reader 28. The inclination angle of the pattern is corrected with high accuracy.

The pattern that has been embedded as the additional information in the image data of the manuscript is formed to include the plurality of dots 19 at the coordinates of the image data (i.e., image 15) of the manuscript, as illustrated in FIG. 2 and FIG. 4A to FIG. 4D. In such cases, the pattern indicating the additional information that has been embedded and the plurality of dots 19 included in the pattern are identified at the coordinates of the image data (i.e., image 15) of the manuscript. Use of such coordinates facilitates a determination of the inclination angle of the pattern indicating the additional information that has been embedded. Therefore, the inclination angle of the pattern that has been embedded in the image data (i.e., image 15) of the manuscript that has been read by the reader 28 is corrected with higher accuracy.

Figure 6:
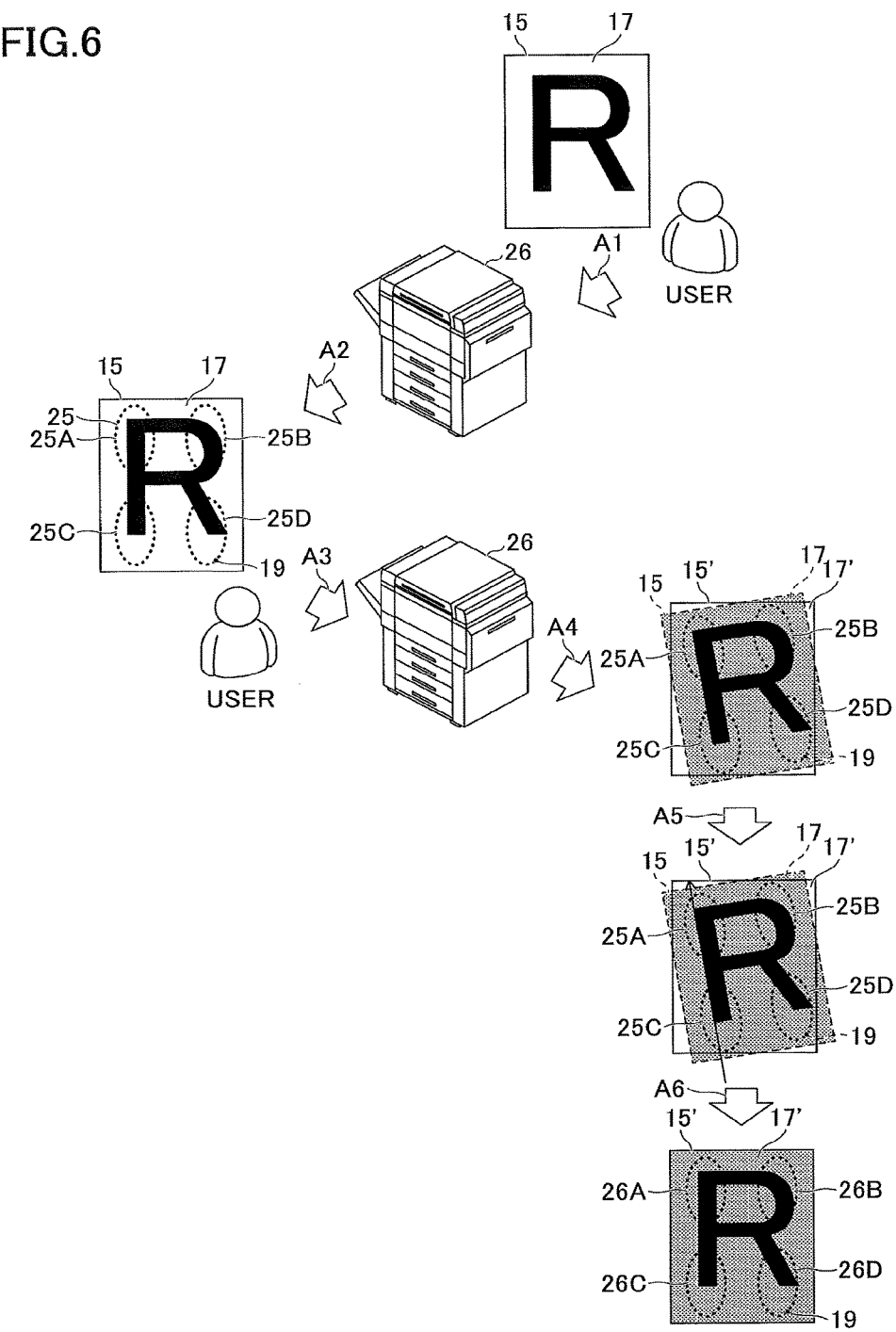
FIG. 6 illustrates a procedure from the time when the additional information is embedded by the information processing apparatus to the time when the additional information is detected by the information processing apparatus, as one example in the first embodiment.
Figure 7:
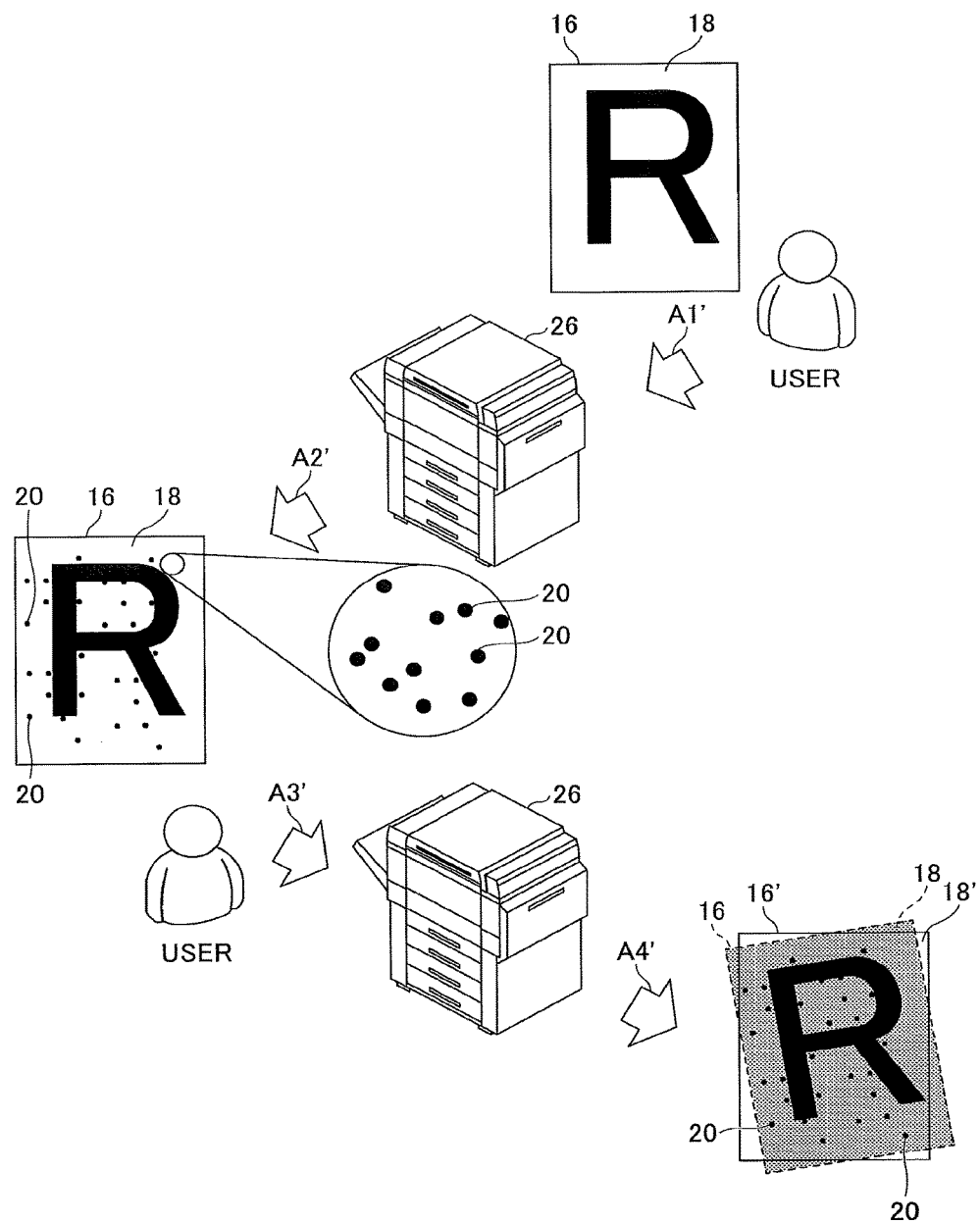
FIG. 7 illustrates a procedure from the time when the additional information is embedded by the information processing apparatus to the time when the additional information is detected by the information processing apparatus, in a related art.

FIG. 6 illustrates a procedure from the time when the information is embedded in the image data of the manuscript by the information processing apparatus to the time when the embedded information in the image data of the manuscript is detected by the information processing apparatus, as one example in the first embodiment. FIG. 7 illustrates a procedure from the time when the information is embedded in the image data of the manuscript to the time when the embedded information in the image data of the manuscript is detected, in a related art. FIG. 7 is provided to be compared with FIG. 6.

In FIG. 6, first, a user prepares image data of a manuscript in which no additional information is embedded (e.g., an image 15 displaying an object 17) and additional information to be embedded. The additional information to be embedded is registered beforehand in a multifunction peripheral 26, which is one example of an information processing apparatus.

The user instructs the multifunction peripheral 26 to perform the embedding process of embedding the additional information that has been registered in the image data (i.e., image 15) of the manuscript (as indicated by arrow A1). In response to an instruction from the user, the multifunction peripheral 26 embeds the additional information that has been registered into the image 15 (as indicated by arrow A2). The additional information that has been embedded is displayed as the plurality of patterns 25A to 25D, in each of which the plurality of dots 19 are arranged in an oval shape, in the image 15. The manuscript (i.e., image 15) is enabled such that the plurality of patterns 25A to 25D serving as the additional information that has been embedded are displayed together with the object 17 (as indicated by arrow A2). At this timing, the embedding process of embedding the additional information is completed.

The user instructs the multifunction peripheral 26 to detect the additional information that has been embedded in the manuscript (i.e., image 15) that is enabled by arrow A2 (as indicated by arrow A3). The multifunction peripheral 26 performs a detecting process of detecting the additional information that has been embedded in the manuscript (i.e., image 15) (as indicated by arrow A4). It should be noted that in the first embodiment, the multifunction peripheral 26 that has been used for the embedding process of embedding the additional information is also used for the detecting process of detecting the additional information that has been embedded. However, the detecting process may be performed by using any other apparatus (without limiting to a multifunction peripheral), which is different from the multifunction peripheral 26 that has been used for the embedding process of embedding the additional information.

In detecting the additional information that has been embedded, first, the multifunction peripheral 26 reads the manuscript (i.e., image 15) in which the additional information has been embedded (as indicated by arrow A4). As illustrated in FIG. 6, when the multifunction peripheral 26 reads the manuscript (i.e., image 15), in some cases, the image data that has been read (i.e., image 15' as indicated by solid lines) might be misaligned with the manuscript before being read (i.e., image 15 as indicated by dashed lines) (as indicated by arrow A5).

In the multifunction peripheral 26, locations of the patterns indicating the additional information that has been embedded (e.g., coordinate data in the image data (i.e., image 15) of the manuscript) when the manuscript is correctly read (i.e., no misalignment occurs at the manuscript while being read) are registered beforehand as the manuscript (i.e., image 15) before being read. Then, the multifunction peripheral 26 detects the embedded pattern in the manuscript (i.e., image 15') that has been read. The multifunction peripheral 26 corrects the locations of the patterns embedded in the image data (i.e., image 15) of the manuscript that have been registered beforehand to the positions of the patterns embedded in the manuscript (i.e., image 15') that has been read (as indicated by arrow A6).

By the above-described correcting process, the patterns of the additional information embedded in the manuscript (i.e., image 15') that have been read are determined to match the patterns of the embedded information that have been registered beforehand. Then, the additional information that has been embedded is extracted.

In contrast, in a related art illustrated in FIG. 7, the additional information is embedded as a pattern in which a plurality of dots 20 are irregularly embedded in the manuscript (i.e., an image 16 displaying an object 18) (as indicated by arrow A1' and arrow A2'). Also in such a related art, as illustrated in FIG. 7, when the additional information that has been embedded is detected, in some cases, the image data that has been read (i.e., image 16') might be misaligned with the manuscript before being read (i.e., image 16) (as indicated by arrow A3' and arrow A4').

In such cases, the pattern embedded in the manuscript before being read (i.e., image 16) (as indicated by broken lines) does not match the pattern embedded in the manuscript after having been read (i.e., image 16') (as indicated by solid lines). Hence, the additional information that has been embedded is not detected. Since the plurality of dots are irregularly allocated, the pattern is not corrected easily. It is difficult to extract the embedded information easily. As described above, by comparing the first embodiment with the related art, the advantages in the first embodiment are exhibited (the embedded information is easily extracted, although the manuscript is read out of alignment).

Figure 8:
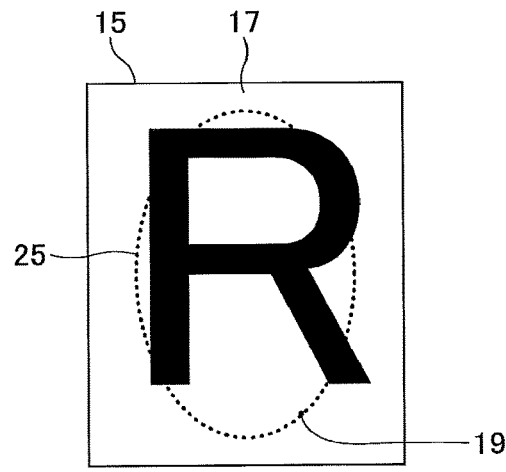
FIG. 8 is a view of a manuscript in which the additional information is embedded by the information processing apparatus, as one example in a second embodiment.

FIG. 8 illustrates a manuscript (i.e., image 15) in which the embedding process has been completed by the information processing apparatus, as one example in a second embodiment. In the first embodiment illustrated in FIG. 2, four patterns (i.e., patterns 25A to 25D), in each of which the plurality of dots 19 are arranged in an oval shape, are embedded as the additional information that has been embedded in the manuscript (i.e., image 15). In contrast, in the second embodiment illustrated in FIG. 8, only a single pattern 25, in which the plurality of dots 19 are arranged, is embedded as the additional information that has been embedded in the manuscript (i.e., image 15).

Also in the case of FIG. 8, the pattern has such a shape that an inclination of the pattern is recognizable (e.g., an oval shape in the second embodiment). The additional information is embedded in such a shape that the inclination of, for example, the oval shape is recognizable. Therefore, even with the additional information being indicated by a single pattern 25 as illustrated in FIG. 8, the location or range of the additional information that has been embedded in the image data of the manuscript (i.e., image 15) is easily identifiable, when the additional information that has been embedded in the manuscript (i.e., image 15) is detected. The additional information that has been embedded in the manuscript (i.e., image 15) is determined easily.

As compared to the second embodiment illustrated in FIG. 8, in the first embodiment illustrated in FIG. 2, four patterns are embedded such that each of the four patterns includes the plurality of dots 19 arranged in an oval shape. Therefore, in the first embodiment illustrated in FIG. 2, the accuracy of detecting the embedded information is higher than the accuracy in the second embodiment illustrated in FIG. 8.

Figure 9:
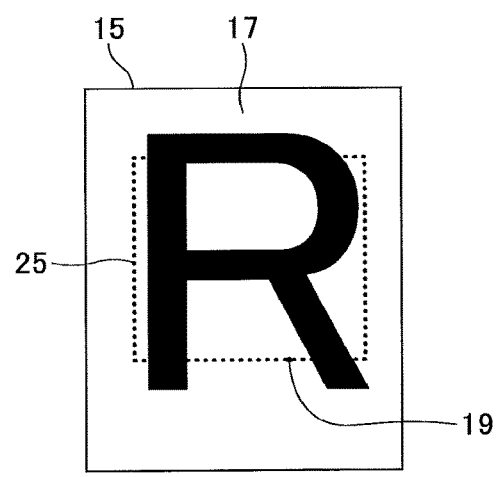
FIG. 9 is a view of a manuscript in which the additional information is embedded by the information processing apparatus, as one example in a third embodiment.

FIG. 9 illustrates a manuscript (i.e., image 15) in which the embedding process has been completed by the information processing apparatus, as one example in a third embodiment. In the above-described second embodiment illustrated in FIG. 8, the pattern 25, in which the plurality of dots 19 are arranged in an oval shape, is embedded as the additional information in the manuscript (i.e., image 15). In contrast, in the third embodiment illustrated in FIG. 9, a pattern, in which the plurality of dots 19 are arranged in a rectangular shape, is embedded as the additional information in the manuscript (i.e., image 15).

Also in FIG. 9, the pattern 25 is arranged in such a shape that the inclination of the pattern is recognizable (e.g., a rectangular shape in the third embodiment). The additional information is embedded in such a shape that the inclination of, for example, the rectangular shape is recognizable. Therefore, even with the additional information being represented by the pattern 25 as illustrated in FIG. 9, the location or range of the additional information that has been embedded in the image data of the manuscript (i.e., image 15) is easily identifiable, in detecting the additional information that has been embedded in the manuscript (i.e., image 15). The additional information that has been embedded in the manuscript (i.e., image 15) is determined easily.

It should be noted that in FIG. 9, a single pattern in which the plurality of dots 19 are arranged in a rectangular shape is indicated as the additional information that has been embedded. However, a plurality of rectangular patterns may be arranged as illustrated in FIG. 2 or FIG. 4A to FIG. 4D. In a case where a plurality of patterns are arranged, a rectangular pattern and an oval pattern may be combined together.

Figure 10A:
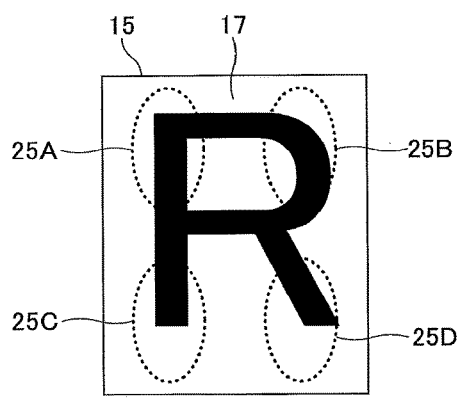
FIG. 10A is a view of a manuscript in which the additional information that is a first pattern is embedded by the information processing apparatus, as one example in a fourth embodiment.
Figure 10B:
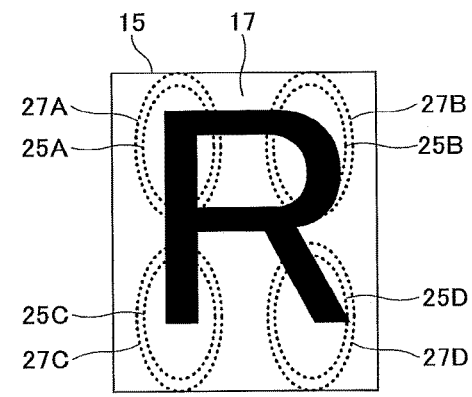
FIG. 10B is a view of a manuscript in which the additional information that is a second pattern is embedded by the information processing apparatus, as one example in the fourth embodiment.

FIG. 10A and FIG. 10B illustrate manuscripts (i.e., image 15) in which the embedding process of embedding the additional information has been completed by the information processing apparatus, as one example in a fourth embodiment. FIG. 11 is a sequence chart illustrating one example of an operation of the information processing apparatus as one example in the fourth embodiment. In this example, as illustrated in FIG. 10B, four patterns 27A to 27D are also embedded in the manuscript (i.e., image 15) on respective outer sides of the four patterns (i.e., patterns 25A to 25D), in each of which the plurality of dots 19 are arranged in an oval shape as the additional information that has been embedded.

The example of FIG. 10A and FIG. 10B will be described with reference to the sequence chart of FIG. 11. The patterns 25A to 25D are embedded in step S19, as illustrated in FIG. 10A. Then, when it is determined that all the information has not been embedded yet, the patterns 27A to 27D are embedded on the respective outer sides of the patterns 25A to 25D in step S19', as illustrated in FIG. 10B.

The patterns 25A to 25D and the patterns 27A to 27D are respective examples of a first pattern and a second pattern. In the fourth embodiment, after the four patterns 25A to 25D are embedded, the four patterns 27A to 27D are embedded on the respective outer sides of the four patterns 25A to 25D. However, the four patterns 27A to 27D may be embedded on respective inner sides of the four patterns 25A to 25D.

The patterns that are arranged as illustrated in FIG. 10B enable more information to be embedded in the patterns 27A to 27D, in addition to the additional information that has been embedded in the patterns 25A to 25D, when all the information cannot be embedded in the patterns 25A to 25D. In other words, when there is an intention to embed more information with the patterns 25A to 25D having been arranged, the patterns 27A to 27D can be arranged, although a space sufficient for arranging other patterns cannot be ensured. Therefore, the number of arranged patterns can be increased even with the space for arranging the patterns being limited in the manuscript.

As illustrated in FIG. 10B, the patterns 27A to 27D are similar in shape to the patterns 25A to 25D. In other words, the oval shapes of the patterns 27A to 27D arranged on the outer sides of the patterns 25A to 25D are similar to the oval shapes of the patterns 25A to 25D.

As described above, by arranging the inner pattern and the outer pattern to be similar in shape, the patterns are arranged easily and the embedding process of embedding the additional information is performed easily. The locations or ranges of the patterns are also easily identifiable. The embedded information is also detected easily.

Figure 12:
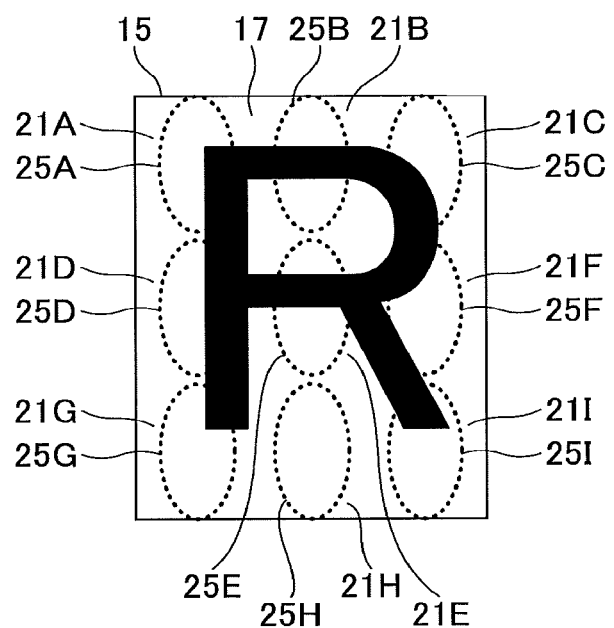
FIG. 12 is a view of a manuscript in which additional information is embedded by the information processing apparatus, as one example in a fifth embodiment.
Figure 13:
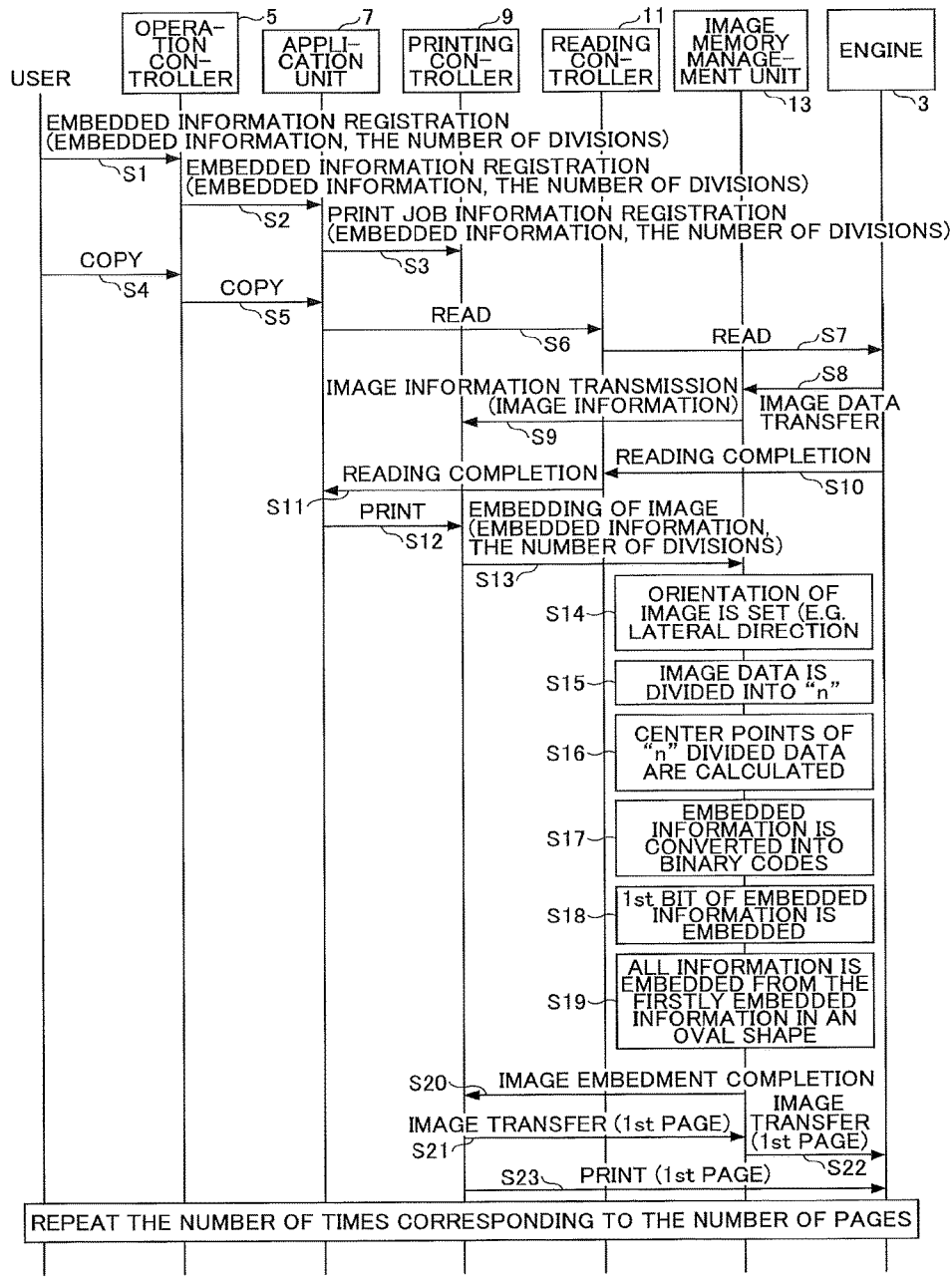
FIG. 13 is a sequence chart illustrating an operation of the information processing apparatus, as one example in the fifth embodiment.

FIG. 12 illustrates a manuscript (i.e., image 15) in which the embedding process of embedding the additional information has been completed by the information processing apparatus, as one example in a fifth embodiment. FIG. 13 is a sequence chart illustrating one example of an operation of the information processing apparatus, as one example in the fifth embodiment. In the fifth embodiment, as illustrated in FIG. 12, nine patterns (i.e., patterns 25A to 25I) are embedded as the additional information in the manuscript (i.e., image 15) such that each of the nine patterns includes the plurality of dots 19 arranged in an oval shape.

For the example of FIG. 12, the step S12 is performed as illustrated in FIG. 13. Then, in performing the embedding process of embedding the additional information, the printing controller 9 indicates the number of divisions together with the additional information to be embedded to the image memory management unit 13 (step S13). The information on the number of divisions is registered in the printing controller 9 together with the additional information to be embedded, when the additional information to be embedded is registered as in step S1 to step S3.

In step S14, the orientation of the image data (i.e., image 15) of the manuscript that has been read as the image data is determined and set to a predetermined direction, as appropriate. Then, in step S15, the image memory management unit 13 divides the image 15 into "n" areas (e.g., "n" is nine and nine areas 21A to 21I in the fifth embodiment) in accordance with the number of divisions that has been indicated. Then, the process goes to step S16 to calculate the center points of the divided n areas. Step S17 and subsequent steps are the same as the steps illustrated in FIG. 3. The procedure of dividing the image data (i.e., image 15) of the manuscript into "n" areas and calculating the respective center points of the divided areas are the same as the procedure illustrated in FIG. 3, except that the number of divided areas is different.

As illustrated in FIG. 12, the increased number of the divided areas in the image 15 increases the number of patterns of the information to be embedded. Unless a part of the patterns is detected, other patterns are detected with higher possibilities. Thus, the accuracy of detecting the embedded information is improved.

Figure 14:
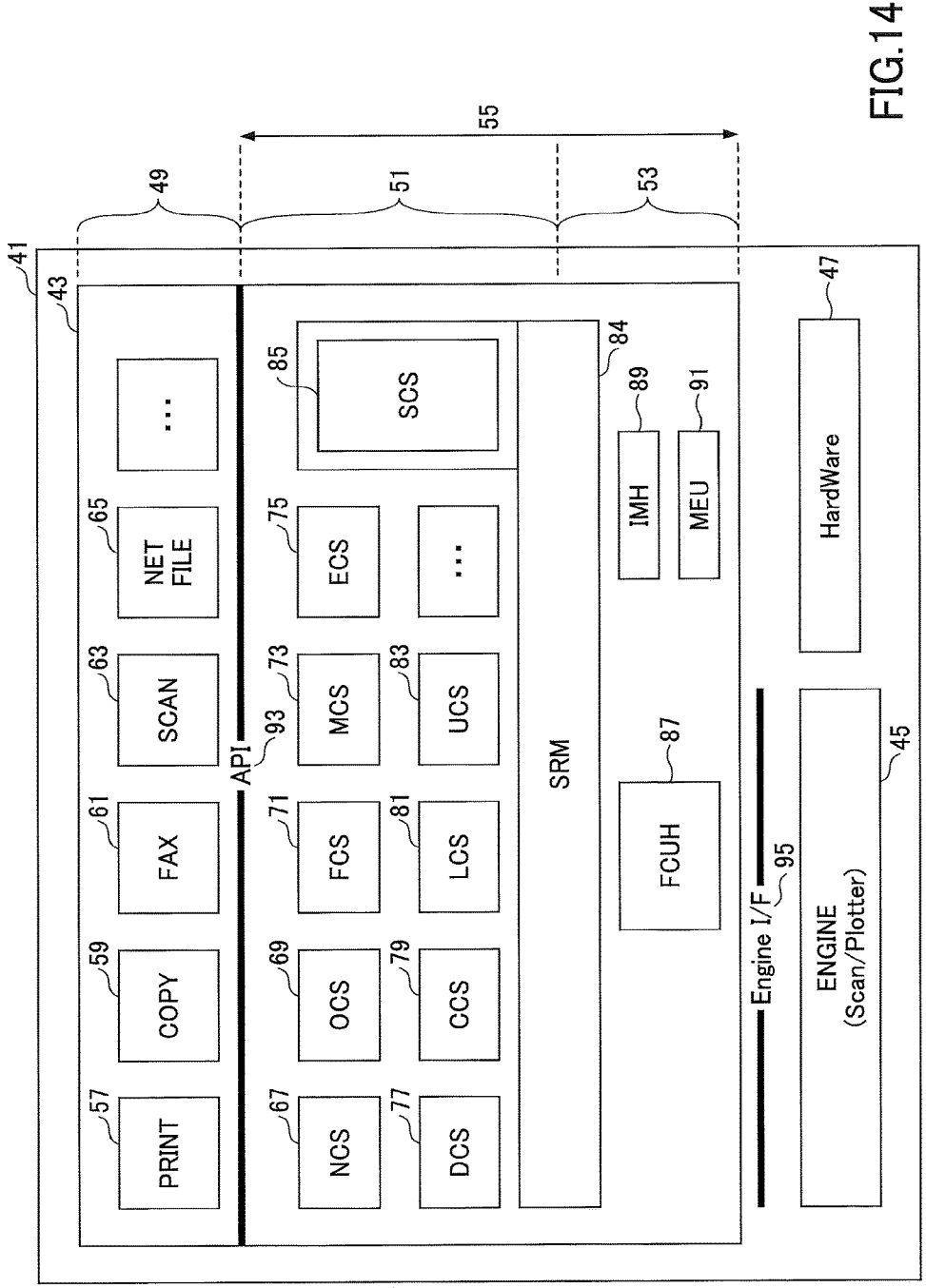
FIG. 14 is a view of a software configuration of a multifunction peripheral that is one example of the information processing apparatus.

FIG. 14 is a configuration view of a multifunction peripheral, as another example of an information processing apparatus, in one or more embodiments. A multifunction peripheral 41 includes a software group 43, an engine unit 45, and a hardware resource 47. The multifunction peripheral 41 activates an application layer 49 and a platform 55.

For example, the multifunction peripheral 41 activates the application layer 49 and the platform 55, by reading programs of the application layer 49 and the platform 55 from an external memory such as a non-volatile memory or an external memory apparatus and transferring the programs that have been read to a memory region. The engine unit 45 includes a reading function and a printing function. The hardware resource 47 may include an ASIC, which exchanges data with the engine unit 45 and which has various functions.

The software group 43 includes the application layer 49 and the platform 55. The application layer 49 is running on an Operating System (hereinafter, referred to as OS) such as UNIX (registered trademark). The application layer 49 includes programs for performing processes specific to user services, such as a printer 57, a copier 59, a facsimile 61, and a reader 63, which are related to image formation.

The platform 55 includes a control service layer 51, a System Resource Manager (hereinafter, referred to as SRM) 84, and a handler layer 53. The control service layer 51 translates a process request from the application layer 49, and generates an acquisition request for acquiring the hardware resource 47. The SRM 84 manages one or more hardware resources 47, and coordinates the acquisition request from the control service layer 51. The handler layer 53 manages one or more hardware resources 47 in response to the acquisition request from the SRM 84.

The control service layer 51 includes at least one of service modules including a Network Control Service (hereinafter, referred to as NCS) 67, an Operation panel Control Service (hereinafter, referred to as OCS) 69, a Facsimile Control Service (hereinafter, referred to as FCS) 71, a Memory Control Service (hereinafter, referred to as MCS) 73, n Engine Control Service (hereinafter, referred to as ECS) 75, a Delivery Control Service (hereinafter, referred to as DCS) 77, a Certification and Charge Control Service (hereinafter, referred to as CCS) 79, a Log Control Service (hereinafter, referred to as LCS) 81, a User information Control Service (hereinafter, referred to as UCS) 83, and a System control Service (hereinafter, referred to as SCS) 85.

The platform 55 is configured to include an API 93 capable of receiving a process request from the application layer 49 in accordance with a predefined function. On the OS, software of the application layer 49 and the platform 55 run in parallel, as processes.

The process of the NCS 67 provides a service commonly available to applications that necessitate a network I/O. The process of the NCS 67 distributes to the applications data received from the network side in accordance with protocols, and coordinates transmission of data from the applications to the network side.

The process of the OCS 69 controls an operation panel, which is an information communicating unit between an operator and an apparatus controller.

The process of the FCS 71 provides an API for, for example, facsimile transmission and reception through a network such as PSTN or ISDN to and from the application layer 49, registration or extract of various facsimile data managed in a backup memory, reading of facsimile documents, and printing of received facsimile documents.

The process of the MCS 73 controls memories such as acquisition and release of memories, and use of a HDD. The process of the ECS 75 controls the engine unit 45 and an engine unit of the hardware resource 47. The process of the DCS 77 controls delivery of the stored document. The CCS 79 controls authentication and charge. The LCS 81 manages and holds log information. The UCS 83 manages user information.

The process of the SCS 85, for example, manages applications, controls an operating unit, displays a system screen, displays LEDs, manages hardware resources, and controls interrupt applications.

The process of the SRM 84 controls systems, and manages the hardware resources 47 in coordination with the SCS 85. For example, the process of the SRM 84 administers and controls the operation in accordance with an acquisition request from a higher layer that uses a plotter included in the engine unit 45 or the hardware resource 47.

To be specific, the process of the SRM 84 determines whether the hardware resource 47 to which the acquisition request has been given is available (i.e., whether the hardware resource 47 is used by another acquisition request). When the hardware resource 47 is available, the process of the SRM 84 reports to a higher layer that the hardware resource 47 to which the acquisition request has been given is available. Additionally, the process of the SRM 84 creates a schedule to allow the use of the hardware resource 47 in response to the acquisition request from the higher layer. The process of the SRM 84 directly performs a requested content (e.g., paper feeding and imaging operation by a printer engine, memory allocation, and file generation).

The handler layer 53 includes a Facsimile Control Unit Handler (hereinafter, referred to as FCUH) 87, and an Image Memory Handler (hereinafter, referred to as IMH) 89. The FCUH 87 manages a facsimile control unit included in the hardware resource 47. The IMH 89 allocates memories to processes, and manages the memories allocated to the processes.

The MEU 91 controls an image conversion related process. By using an engine I/F 95 that enables transmission of a process request for processing the hardware resource 47 in accordance with a predefined function, the SRM 84 and the FCUH 87 makes the process request for processing the hardware resource 47.

Figure 15:
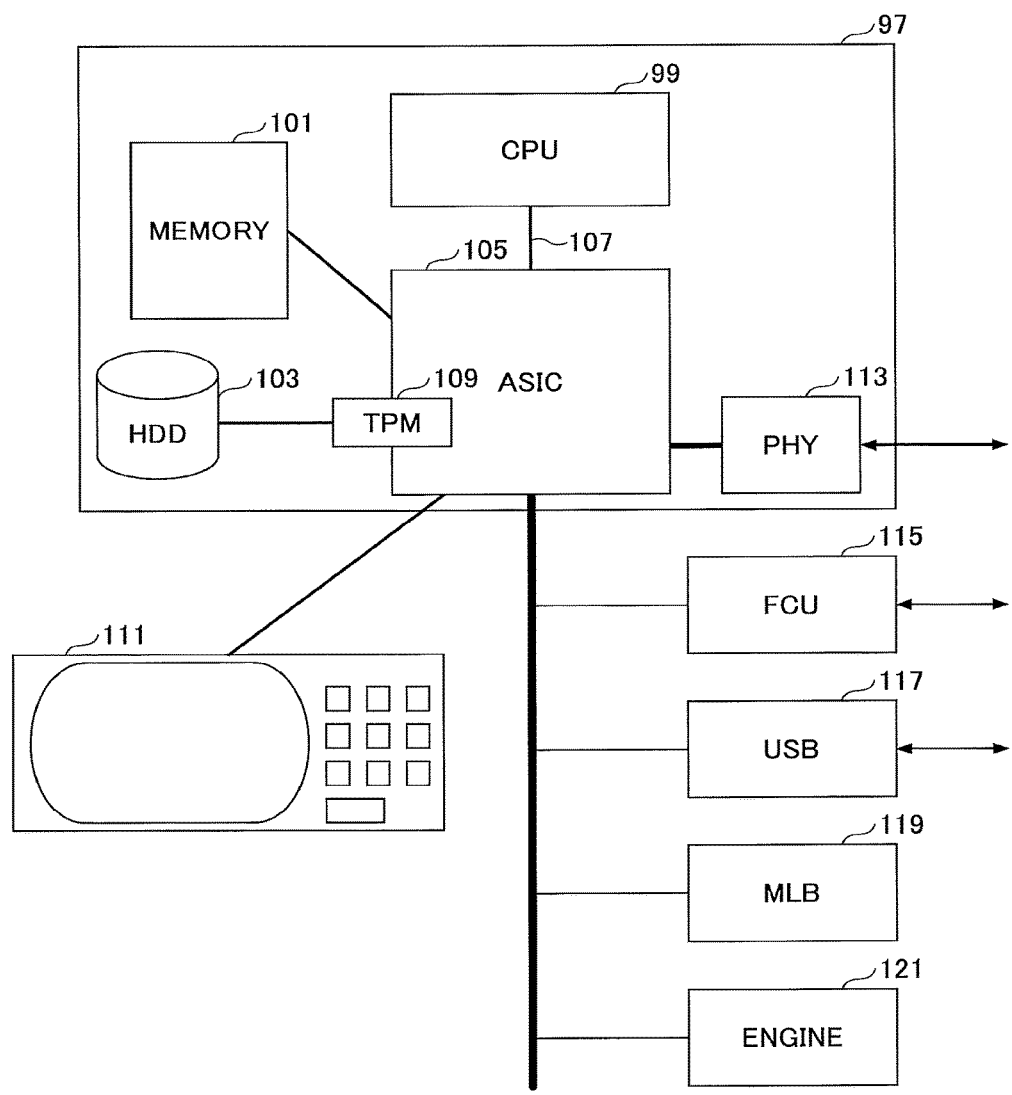
FIG. 15 is a view of a hardware configuration of the multifunction peripheral that is one example of the information processing apparatus.

FIG. 15 is a hardware configuration view of a multifunction peripheral, in one embodiment. The hardware resource 47 included in the multifunction peripheral 41 includes a controller 97, an operation panel 111, an FCU 115, a USB device 117, an MLB 119, and an engine unit 121.

The controller 97 includes a CPU 99, a system memory 101, an ASIC 105, a HDD 103, and a TPM (i.e., encryption) chip 109, and a PHY 113. The controller 97 includes the controller 1 and the engine 3 illustrated in FIG. 1, and the controller 29 and the engine 31 illustrated in FIG. 5.

The operation panel 111 is coupled to the ASIC 105 of the controller 97. The MLB 119, the FCU 115, the USB device 117, and the engine unit 121 (including a scanner or a plotter engine) are coupled to the ASIC 105 of the controller 97 via a data transfer bus 107.

The CPU 99 controls the whole multifunction peripheral 41. The CPU 99 activates the NCS 67, the OCS 69, the FCS 71, the MCS 73, the ECS 75, the DCS 77, the CCS 79, the LCS 81, the UCS 83, the SCS 85, the SRM 84, the FCUH 87, the IMH 89, and the MEU 91, as processes on the OS, and operates the processes.

The CPU 99 activates and operates the printer 57, the copier 59, the facsimile 61, the reader 63, and a net file 65, which are included in the application layer 49. The multifunction peripheral 41 includes the reader 28 illustrated in FIG. 5.

As one example, a request for reading an image is generated by the copier 59, the facsimile 61, or the reader 63. The image is read by using the hardware resource 47 through the platform 55. The image that has been read is input into the memory 101, is encrypted through the TMP chip 109 in accordance with the application settings or device settings, and is then recorded in the HDD 103.

An encryption key of the TMP chip 109 is managed by the TMP chip 109. This configuration has an advantage of being robust against attacks from the outside. Accordingly, the information leakage risk caused by theft of the HDD 103 or analysis of data is reduced.

Heretofore, one or more embodiments have been described, but the present application is not limited to these embodiments. Various variations and modifications may be made without departing from the scope of the present application.

What is claimed is:

1. An information processing apparatus, comprising:
a manuscript reader configured to read a manuscript; and
processing circuitry configured to embed additional information into data of the read manuscript, the processing circuitry configured to embed, as the additional information, a plurality of patterns, each including a plurality of dots and each having an oval contour, wherein the patterns are embedded into the data of the read manuscript and are arranged along same directions, respectively, so that an inclination of the manuscript is detectable,
wherein each of the plurality of patterns includes a first pattern having a first plurality of dots and a second pattern having a second plurality of dots, the second pattern enclosing the first pattern, and being different in size than the first pattern, and
the first plurality of dots and the second plurality of dots each form an identical shape.

2. The information processing apparatus according to claim 1, wherein the manuscript reader is further configured to set an orientation of the manuscript to a predetermined direction.

3. The information processing apparatus according to claim 1, wherein the processing circuitry is further configured to divide the manuscript into a plurality of areas, and embed one of the plurality of patterns in each of the plurality of areas that have been divided.

4. The information processing apparatus according to claim 1, wherein the second pattern includes information that is not embedded in the first pattern, in the additional information.

5. The information processing apparatus of claim 1, wherein the processing circuitry is further configured to embed each of the plurality of patterns, each pattern including a first dot pattern formed inside a second dot pattern.

6. An information processing apparatus, comprising:
 a manuscript reader configured to read a manuscript in which additional information is embedded, the additional information being embedded in data of the manuscript as a plurality of patterns, each including a plurality of dots and each having an oval contour, wherein the patterns are embedded into the data of the read manuscript and are arranged along same directions, respectively, so that an inclination of the manuscript is detectable,
 wherein each of the plurality of patterns includes a first pattern having a first plurality of dots and a second pattern having a second plurality of dots, the second pattern enclosing the first pattern, and being different in size than the first pattern, and
 the first plurality of dots and the second plurality of dots each form an identical shape;
 and
 processing circuitry configured to
  generate an instruction for performing a process of detecting the additional information embedded in the data of the manuscript read by the manuscript reader,
  perform the process of detecting the additional information in response to the instruction; and
  correct an inclination of a pattern of a reference manuscript serving as a predetermined reference in accordance with an inclination angle between the inclination of one of the patterns embedded in the data of the manuscript and the inclination of the pattern of the reference manuscript,
 wherein the processing circuitry is further configured to detect the additional information embedded in the data of the manuscript at same positions as the pattern of the reference manuscript that has been corrected.

7. The information processing apparatus according to claim 6,
 wherein each pattern includes the plurality of dots, which are arranged at coordinates of the manuscript, and
 wherein the inclination angle is calculated from the coordinates.

8. The information processing apparatus of claim 6, wherein the processing circuitry is further configured to detect each of the plurality of patterns, each pattern including a first dot pattern formed inside a second dot pattern.

* * * * *